Sept. 28, 1948.  J. E. KRILOW  2,450,348
VEGETABLE SLITTING UTENSIL
Filed June 2, 1945
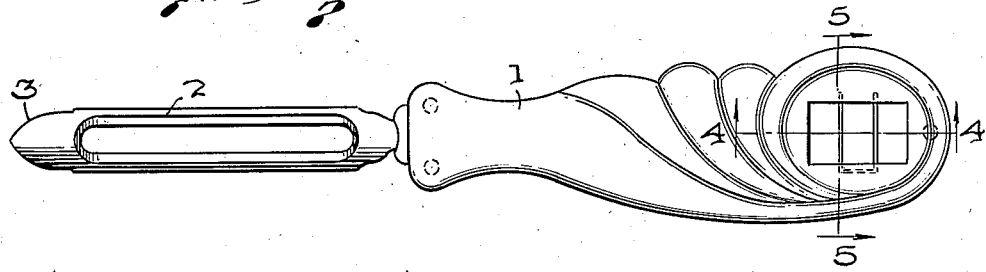
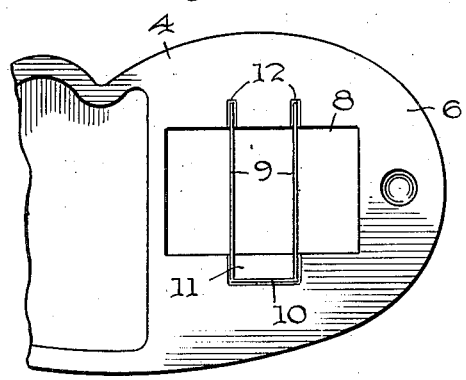
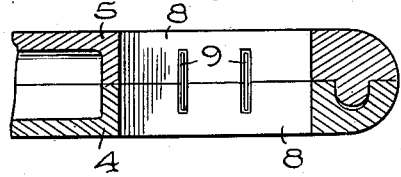
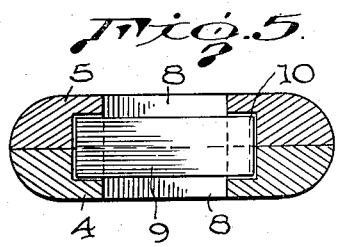
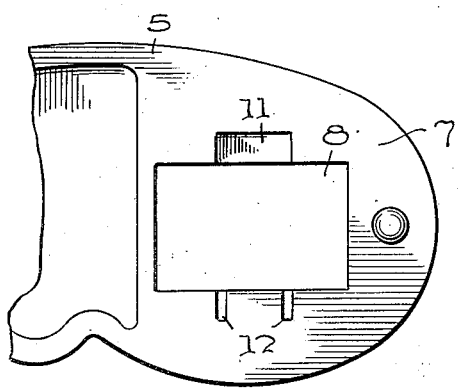
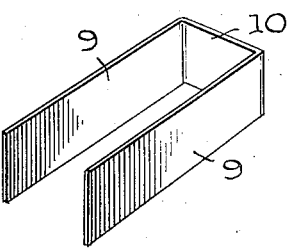
INVENTOR.
JAMES E. KRILOW
BY
*Lee F. Townshend*
ATTORNEY Patented Sept. 28, 1948

2,450,348

UNITED STATES PATENT OFFICE 2,450,348

VEGETABLE SLITTING UTENSIL

James E. Krilow, Atlantic City, N. J., assignor to Boardwalk Enterprises, Inc., Atlantic City, N. J., a corporation of New Jersey Application June 2, 1945, Serial No. 597,214

2 Claims. (Cl. 30—304)

This invention relates to vegetable slitters or cutters usually used for longitudinally slicing or "shoestringing" string beans and more particularly to a simple, sturdy and practical mount for the cutting knives that adapts itself for positioning in the handle of a combination kitchen utensil.

The primary object of the invention is to rigidly mount the blades of the slitting knives across an aperture in a utensil handle or the like in such a manner as to prevent them from being sprung from position in use with the resulting loss of the blades or possible injury to the operator.

Another object of this invention is to mount the slitting knives in a bi-sectional support or handle which when assembled as a unit securely holds the knives in operative position.

A further object of the invention relates to forming the cutting means employed of a single piece of material instead of separate blades which makes the mounting of the cutting unit more secure in the handle.

These and other objects of the present invention will appear as the following description thereof proceeds, and in order to more clearly understand the invention, reference may be had to the accompanying drawings in which an embodiment of the invention is shown.

In the drawings:

Figure 1 is a plan view of the vegetable slitter mounted in the handle of a combination kitchen utensil;

Figure 2 is a plan view of one end of the bi-sectional handle showing the cutter positioned therein;

Figure 3 is a similar view of the complementary portion of the bi-sectional handle;

Figure 4 is a section on the line 4—4 of Figure 1;

Figure 5 is a section on the line 5—5 of Figure 1; and

Figure 6 is a perspective view of the cutting unit.

The invention is illustrated as applied to the handle 1 of a conventional form of vegetable slicer. The slicer is of a conventional oscillating blade type coaxial with the handle and comprises a guided cutting blade 2 having a corer tip 3 with the blade mounted to oscillate in the handle 1 by means not shown. This structure forms no part of my invention and the term handle is used in a generic sense as including any support for the vegetable slicer.

The handle 1 is usually formed of molded plastic and comprises two complementary sections 4 and 5 relieved throughout a portion of each length. The outer end portions are not relieved and have flat meeting faces 6 and 7 through which extend correspondingly sized apertures 8 which when the handle is assembled aline to form an aperture therethrough. Suitable dowel pins and sockets line up the sections of the handle for assembly as a unit. When the sections 4 and 5 are formed of molded plastic, they may be acetone sealed in the usual manner.

The cutting means employed for slitting the vegetables is formed as a single unit as shown in Figure 6. This unit comprises a U-shaped strip having parallel blades 9 forming the U arms that are connected by the base 10. The blades 9 extend across the opening in the handle 1 formed by the apertures 8 of the sections as clearly shown in Figure 1, when mounted as will be described.

At one side of the apertures 8 in the meeting faces 6 and 7 of the complementary sections of the handle, there is formed an inset socket shelf 11. The opposite side of said apertures each have spaced sockets 12 opening into the faces of the sections and walls of the recesses. The depth of the sockets 12 and shelves 11 is approximately half the height of the U-shaped cutting strip. The base 10 of the cutter fits into the socket formed by the shelves 11 and the ends of the blade arms 9 fit into the spaced sockets 12.

In assembling this utensil for use, the cutting unit is placed in the open section 4 of the handle 1 as shown in Figure 2. Approximately one half of the cutter will extend above the face 6 when it is seated on the shelf 11 and in the sockets 12. The complementary section 5 of the handle is then placed over the section 4 with the meeting faces 6 and 7 engaging which encloses the cutter as clearly shown in Figures 4 and 5. The sections are then sealed together as a unit which securely mounts the cutter within the handle.

By this simple mounting means, the blade or knife arms 9 extend across the aperture in the end of the assembled handle 1 in parallel spaced relation for functioning in the well known manner. There is no possibility of the cutting knives or blades 9 being sprung from position by the beans being pushed or pulled through the aperture in the handle. The bi-sectional handle mount securely locks the blades by the act of securing the sections of the handle together as a unit. The fact that the blades 9 are connected by the encased base 10 and are a unitary structure additionally prevents any possibility of blade displacement in use.

This application is a continuation-in-part of my copending original application Serial Number 535,786 filed May 16, 1944.

While the device herein disclosed has been described with more or less particularity, it is to be expressly understood that the invention is not limited to said device or otherwise than by the terms of the appended claims.

I claim:

1. A vegetable slitter comprising a bi-sectional support, each section having a walled aperture alined with the other when the sections are assembled in face to face contact, the portion of the section adjacent each aperture being provided with spaced sockets opening through the wall of the aperture and contact face at one side of the aperture and an inset wall shelf at the other side of the aperture also opening through the contact face, said sockets and shelves being alined when the sections are in face to face contact, and a U-shaped cutter enclosed in the support when the sections are assembled with its base seated on the alined shelves and its arms extending across the aperture and seated in the opposite alined sockets.

2. In a kitchen utensil, a bi-sectional handle, each section having a walled aperture in alinement when the sections are assembled to form an opening therethrough, a unitary cutting means associated with said aperture comprising a plurality of spaced slitting blades connected at one end and said end being seated in a bi-sectional recess formed in one wall of the aperture, said blades extending across the opening with the free ends thereof seated in bi-sectional sockets in the opposite wall of said aperture.

JAMES E. KRILOW.

REFERENCES CITED

The following references are of record in the file of this patent:

UNITED STATES PATENTS

| Number | Name | Date |
| --- | --- | --- |
| 2,220,169 | Murdock | Nov. 5, 1940 |
| 2,323,863 | Feemster | July 6, 1943 |